United States Patent [19]

Fantera

[11] 3,909,720

[45] Sept. 30, 1975

[54] PERFORMANCE MONITORING/FAULT LOCATION TEST SET FOR TROPO-RADIO EQUIPMENT

[75] Inventor: Italo A. Fantera, Holland Patent, N.Y.

[73] Assignee: The United States of America as represented by the Secretary of the Air Force, Washington, D.C.

[22] Filed: Dec. 11, 1973

[21] Appl. No.: 423,864

[52] U.S. Cl. ................ 325/41; 179/15 FD; 325/31; 325/59; 325/67; 325/305; 325/363

[51] Int. Cl.² ............................................ H04J 1/16

[58] Field of Search ............ 325/31, 40, 41, 44, 47, 325/366-368, 371, 473, 474; 179/15 FD; 343/176

[56] References Cited

UNITED STATES PATENTS

| | | | |
|---|---|---|---|
| 3,354,433 | 11/1967 | Minc | 325/56 |
| 3,415,947 | 12/1968 | Abbey et al. | 325/31 |
| 3,476,922 | 11/1969 | Yiotis | 325/304 |

*Primary Examiner*—Robert L. Griffin
*Assistant Examiner*—Marc E. Bookbinder
*Attorney, Agent, or Firm*—Joseph E. Rusz; William Stepanishen

[57] ABSTRACT

A performance monitoring/fault location apparatus for tropo-radio equipment for measuring the performance status of on-line, in service troposcatter radio equipment.

1 Claim, 2 Drawing Figures

PERFORMANCE MONITORING/FAULT LOCATION TEST SET FOR TROPO-RADIO EQUIPMENT

BACKGROUND OF THE INVENTION

The present invention relates broadly to a troposcatter radio system and in particular to a performance monitoring/fault location test set for troposcatter radio equipment.

The method or system of transmitting microwaves within the troposphere to effect radio communication between two points on the earth's surface has been utilized in many areas of intelligence communications. The troposphere is the lower layer of the earth's atmosphere which extends to about 60,000 feet at the equator and 30,000 feet at the poles. The use of tropospheric scattering provides the means for communicating over moderate distances of from 70 to 600 miles. However, such a span may be augmented by other spans in tandem to permit end to end or through circuits up to many thousand miles. Thus, the maximum range for wireless communications at frequencies from several hundred megacycles on up into the microwave no longer depends on the line of sight distance between the transmitter and receiver which was severely limited by both the earth's curvature and intervening physical obsticles, such as mountainous terrain. However, it has been found that various features of the terrain and the atmosphere above it, may be combined to support communications at these frequencies far beyond the line of sight limitation. For example, sharp obstructions such as mountain peaks and ridges cause diffraction of the transmitted waves by bending them to follow along the earth's surface. In addition, changes in the refractive index of the atmosphere which is caused by temperature inversions and other natural phenomena, turn waves back toward the earth at distances far from the transmitter.

Until the present invention, the communication equipment which has provided troposcatter communications suffered the usual degradation of service after a period of operation. The method most often utilized in the prior art to maintain a specified level of communication was to perform routine system maintainence at predetermined scheduled time intervals. In the event the system performance failed or was otherwise degraded between the scheduled maintainence interval, the reliance was upon complaints of poor service or performance by the user of the communication system. The present invention provides the means for automatically monitoring system performance during system use.

SUMMARY

The present invention utilizes a binary test pattern for evaluating the performance of in-service troposcatter radio equipment. A binary test pattern is transmitted through a voice frequency channel of an in-service, quadruple diversity, baseband combining, FDM/FM troposcatter communications link. At the distant receive station, the bit-error-rate (BER) is simultaneously measured at the diversity combined output and at the outputs of each of the four diversity receivers. The various combinations of the diversity combined BER and the individual receiver BER's are used for systematically locating failure, malfunctions, and and/or significant degradations within the tropo-equipment.

It is one object of the invention, therefore, to provide an improved performance monitoring/fault location test apparatus for tropo-radio equipment utilizing bit error rates modem performance for evaluating the performance of in-service tropo-scatter radio equipment.

It is another object of the invention to provide an improved tropo-radio test apparatus utilizing a breakout of a voice frequency channel from the four diversity receivers for the purpose of providing performance assessment information.

It is yet another object of the invention to provide an improved tropo-radio test apparatus utilizing the various combinations of the diversity combined bit error rates and the individual receiver bit error rates for systematically locating failures, malfunctions, and/or significant degradations within the tropo-radio equipment.

These and other advantages, features and objects of the invention will become more apparent from the following description taken in conjunction with the illustrative embodiment in the accompanying drawings.

DESCRIPTION OF THE PREFERRED EMBODIMENT

Figure 1:
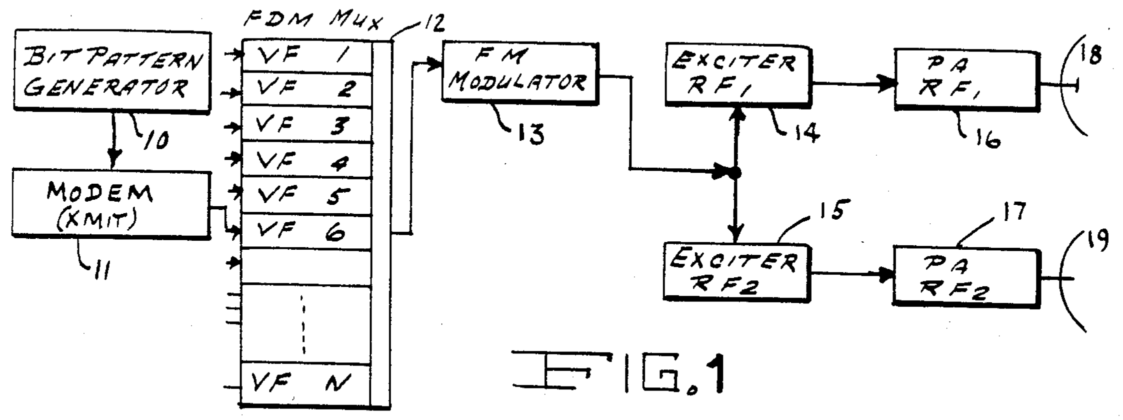
FIG. 1 is a block diagram (of the transmit configuration) of the performance monitoring/fault location apparatus.

Referring now to FIG. 1, there is shown the transmit configuration of the performance monitoring/fault location test apparatus. It consists of a bit pattern generator 10 and a voice channel data modem 11. The bit pattern generator 10 furnishes a known and constantly repeatable binary test word, or pattern. This is applied to the transmit portion of a data modem 11 where it is digitally modulated (modem) for compatibility with a VF (voice frequency) channel. The modem output is shown entering the transmit portion of an FDM/FM troposcatter communication link: Entry is into one VF channel of an N VF channel multiplexer 12. It may be assumed that all other of the N channels are constantly and simultaneously in use by telephone type subscribers. The signal out of the FDM multiplexer unit 12 therefore includes not only the repeating bit test pattern, but also voice transmissions through the remainder of the N channels. This single output from 12 is next applied to the FM modulator 13 where it is used to frequency modulate an RF carrier signal whose rest frequency is 70 Mhz. This modulated carrier is next applied simultaneously to RF 1 exciter 14 and RF 2 exciter 15. Within these exciter units, the frequency modulated 70 MHz carrier is translated up to two different frequencies, RF 1 and RF 2, respectively, without altering the frequency modulation contained within. These modulated signals, RF 1 and RF 2 are next applied to power amplifiers 16 and 17, respectively, where they are amplified to a high level of RF power. The amplified RF 1 and RF 2 signals are next applied to highly directional antennas, 18 and 19, respectively, which are arranged in a space diversity configuration for transmission to a single, distant station. This redundancy in antennas 18 and 19, plus the redundancy in transmissions RF 1 and RF 2, provides protection against short-term fading which characterizes individual tropo signals.

Figure 2:
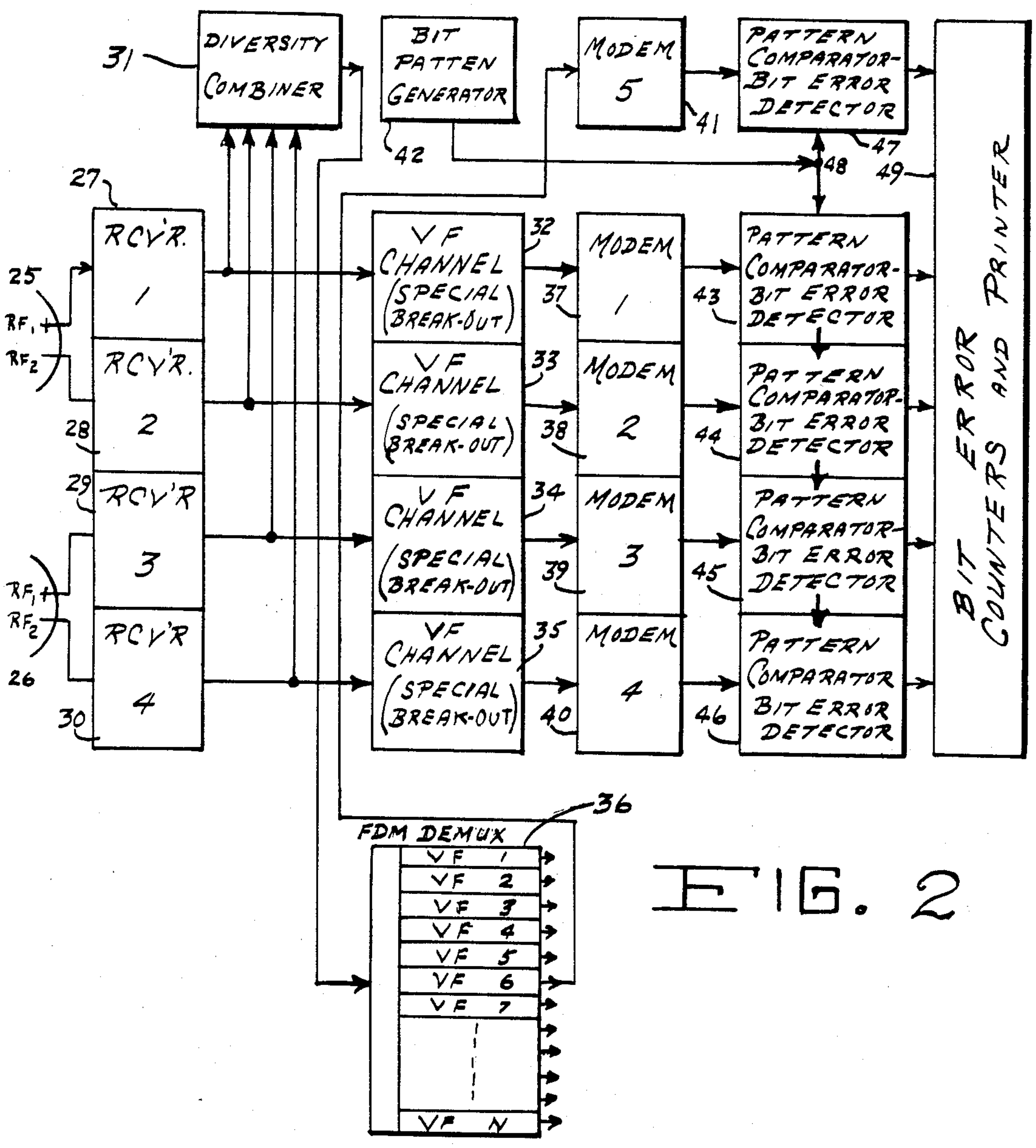
FIG. 2 is a block diagram of the receive configuration of the performance monitoring/fault location apparatus in accordance with this invention.

Turning now to FIG. 2, there is shown the receiver configuration at the distant station. Here, the performance monitoring/fault location test apparatus consists of the 4 VF channel special break-out units 32-35, the five modems 37–41, the bit pattern generator 42, the five pattern comparator-bit error detectors 43–47 and the bit error counters/printer 49. All else are the normal portions of a quad-diversity, FDM/FM troposcatter receive equipment.

The RF signals which were transmitted RF 1 and RF2 are received by the two space diversity antennas 25 and 26. Each antenna receives both RF frequencies RF 1 and RF 2 simultaneously. The RF 1 signal is shown received by receivers 27 and 29 while the RF 2 signal is received by receivers 28 and 30. The outputs from the receivers are applied to the diversity combiner 31. Here, the redundant signals are combined (overlayed) into a single signal. This combined signal has short term fading characteristics which are less severe than that of any individual signal. Thus, the severe fading associated with any one signal has been combatted. The output of the diversity combiner is applied to the VF channel demultiplexer 36. This accomplishes the complimentary function of the multiplexer unit (Item 12, FIG. 1); it breaks out each of the N individual VF channels. This break-out, of course, includes the VF channel containing the digitally modulated binary test word. In addition, the outputs of the four receivers 27–30 are also applied to VF channel special break-out units 32–35. Each of these break out only that one VF channel which contains the digitally modulated binary test word. These five outputs from the VF channel containing the binary test word are applied to the receive modems 37–41. These demodulate (modem) or remove the digital modulation from the binary test words. The modem outputs are next applied to the pattern comparator-bit error detector units 43–47, respectively. A locally generated binary test pattern, identical to 10 of FIG. 1 is also applied to these units. This local pattern, identical to the pattern which was actually transmitted, provides the reference against which the received patterns are compared. These comparisons are made on a bit-by-bit basis. Any discrepancy constitutes a bit error. These bit errors are separately counted and hard copy recorded on a 5 or 10 minute periodic basis. Errors per 5 or 10 minutes are bit error rate (BER). BER is performed continuously and simultaneously from each of the four diversity receivers and the one diversity combined output. BER from these five outputs is determined and recorded continuously, every 5 or 10 minutes and all for the same 5 or 10 minute periods. The transmitting portion of the modem must be adjusted, in modulation level to cause bit errors to occur. Bit errors occur when noise in the VF channel becomes comparable with the modem signal in that channel. Measurement of that noise in terms of BER may require adjustment of the modem signal. The BER measurements at the five indicated locations provide a statistical basis for identifying the noise in the VF channel which is causing bit errors.

The BER counts are examined and interpreted to determine the source of the noise. If the tropo radio preformance happens to be limiting on excessive equipment noise (equipment malfunction/deterioration, etc.) then the BER count, from the output which contains the defective equipment, would be higher than the others. If the tropo radio performance happens to be limiting on propagation noise, then the BER count from the four diversity receivers would be of the same magnitude. Thus, performance monitoring and fault location on troposcatter radio equipment may be accomplished.

It should be noted that the modem units (Item 11, FIG. 1 and items 37–41, FIG. 2) have been off-the-shelf for a number of years and are listed as voice channel or wireline modems. Speeds up to 2400 bps (bits per second) is adequate in the present application. All modems have a duplex (simultaneous transmit and receive) capability. In addition, the Lenkurt Electric 26C units already contain the bit pattern generators. The bit pattern generators (Item 10, FIG. 1, Item 42, FIG. 2), pattern comparator-bit error detectors (Items 43–47, FIG. 2) bit error counters and printer (Item 49, FIG. 2) are available as single units, usually called bit error rate testers. The manufacturers include Frederick Electric, Systron Donner, Milgo, etc.

Although the invention has been described with references to a particular embodiment, it will be understood to those skilled in the art that the invention is capable of a variety of alternative embodiments within the spirit and scope of the appended claims.

I claim:

1. a performance monitoring/fault location test apparatus for troposcatter radio communication systems comprising in combination a bit pattern generator to provide a binary test pattern said binary test pattern containing a predetermined binary code, an FDM/FM transmitter unit being connected to said bit pattern generator to receive said binary test pattern, said FDM/FM transmitter unit having a plurality of voice channels and a modem unit, said modem unit being connected to one of said plurality of voice channels, said modem unit digitally modulating said binary test pattern for compatibility with said voice channels and applying said binary test pattern into one of said plurality of voice channels, said plurality of voice channels having voice transmissions therein, said binary test pattern and said plurality of voice transmissions being modulated by an FM modulator to provide a modulated output signal, a first and second frequency carrier generator and translator means to provide first and second radio frequency carriers, and further translating up said modulated output signal to said first and second radio frequency carriers within said first and second radio frequency carrier generator and translator means, said first and second radio frequency carriers being transmitted by said FDM transmitter unit, a plurality of diversity receivers to receive said first and second radio frequency carriers, said plurality of diversity receivers comprising four receivers, first and third receivers receiving said first radio frequency carrier, and second and fourth receivers receiving said second radio frequency carrier, said first and second radio frequency carrier contain said binary test pattern, a diversity combiner unit connected to said four receivers to receive the outputs of said four receivers to provide a combined output, a plurality of voice frequency channel units, each to receive the output of a corresponding receiver respectively, said combined output being applied to a further voice frequency channel unit, said plurality of voice frequency channel units and said further voice frequency channel unit providing said modulated binary test pattern as an output signal, a plurality of modem units connected respectively to said plurality of voice frequency channel units, said plurality of modem units demodulating said binary test pattern to provide a binary code output, means for generating a local test pattern and, a plurality of pattern comparator-bit error detector unit to compare said binary code outputs respectively with said local test pattern to detect differences, said differences being bit errors, said bit errors providing an indication of the performance of said troposcattered radio communication system.

* * * * *